(12) United States Patent
Itoh et al.

(10) Patent No.: US 11,761,383 B2
(45) Date of Patent: Sep. 19, 2023

(54) BURNER WITH TORCH IGNITION MECHANISM AND OPERATION METHOD THEREOF

(71) Applicant: TOSHIBA ENERGY SYSTEMS & SOLUTIONS CORPORATION, Kanagawa (JP)

(72) Inventors: Masao Itoh, Yokohama Kanagawa (JP); Yasunori Iwai, Yokohama Kanagawa (JP); Yuichi Morisawa, Yokohama Kanagawa (JP); Hiroki Kasuya, Yokohama Kanagawa (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/837,745

(22) Filed: Jun. 10, 2022

(65) Prior Publication Data
US 2022/0397274 A1 Dec. 15, 2022

(30) Foreign Application Priority Data
Jun. 14, 2021 (JP) .................................. 2021-098774

(51) Int. Cl.
*F02C 7/264* (2006.01)
*F02C 9/50* (2006.01)
*F23R 3/28* (2006.01)
*F23R 3/42* (2006.01)

(52) U.S. Cl.
CPC ................ *F02C 7/264* (2013.01); *F02C 9/50* (2013.01); *F23R 3/28* (2013.01); *F23R 3/42* (2013.01); *F23R 2900/00009* (2013.01)

(58) Field of Classification Search
CPC . F02C 7/264; F02C 7/266; F23R 2900/00009
See application file for complete search history.

(56) References Cited

U.S. PATENT DOCUMENTS

| 4,215,979 | A | * | 8/1980 | Morishita | ............... F02C 7/264 |
| | | | | | 431/263 |
| 4,860,533 | A | | 8/1989 | Joshi | |
| 4,912,931 | A | * | 4/1990 | Joshi | ........................ F23M 5/00 |
| | | | | | 60/753 |
| 8,616,006 | B2 | | 12/2013 | Rocci Denis et al. | |

(Continued)

FOREIGN PATENT DOCUMENTS

| CN | 103822208 A | 5/2014 |
| JP | 2012-117535 A | 6/2012 |
| JP | 2019-056547 A | 4/2019 |

*Primary Examiner* — William H Rodriguez
(74) *Attorney, Agent, or Firm* — Foley & Lardner LLP (57) ABSTRACT

In a burner of an embodiment, a torch part includes: a torch combustor liner that is provided in a torch part casing and burns a fuel and an oxidant; a torch fuel supply part that supplies a fuel; a torch oxidant supply part that supplies an oxidant; an ignition device that ignites a fuel-air mixture; and a combustion gas pipe that is arranged at the center of the torch part and leads a combustion gas in the torch combustor liner to one end side of the torch part. A main fuel-main oxidant supply part includes: a main fuel supply passage formed in an annular shape on an outer periphery of the torch part; and a main oxidant supply passage formed in an annular shape on an outer periphery of the main fuel supply passage.

4 Claims, 6 Drawing Sheets

(56) References Cited

U.S. PATENT DOCUMENTS

| | | | |
|---|---|---|---|
| 11,543,130 B1* | 1/2023 | Ryon | F23R 3/10 |
| 2002/0170294 A1 | 11/2002 | Stalder et al. | |
| 2011/0113787 A1 | 5/2011 | Milosavljevic | |
| 2014/0026579 A1 | 1/2014 | Karlsson et al. | |
| 2016/0084169 A1* | 3/2016 | Stuttaford | F23R 3/343 60/776 |
| 2018/0171869 A1* | 6/2018 | Kim | F02C 3/34 |
| 2019/0032561 A1 | 1/2019 | Stoia et al. | |
| 2019/0072331 A1 | 3/2019 | Yamamoto et al. | |
| 2019/0346142 A1* | 11/2019 | Cires | F23R 3/343 |

* cited by examiner

BURNER WITH TORCH IGNITION MECHANISM AND OPERATION METHOD THEREOF

CROSS REFERENCE TO RELATED APPLICATIONS

This application is based upon and claims the benefit of priority from Japanese Patent Application No. 2021-098774, filed on Jun. 14, 2021; the entire contents of which are incorporated herein by reference.

FIELD

Embodiments described herein relate generally to a burner with a torch ignition mechanism and an operation method thereof.

BACKGROUND

In the combustor of a gas turbine, there is a combustor employing a diffusion combustion system in which a fuel and an oxidant supplied from a burner are burned in a combustor liner. This combustor includes an ignition device that ignites a mixture of the fuel and the oxidant mixed in the combustor liner.

As the ignition device provided in the combustor, there is employed a laser ignition device that ignites an air-fuel mixture in a combustor liner by a laser or a spark ignition device that ignites an air-fuel mixture in a combustor liner by spark discharge.

In a conventional combustor, laser light is emitted to an optimal position in a combustor liner from a direction vertical to the center axis direction (a longitudinal direction of the combustor liner) of the combustor liner formed of a cylinder body, or a spark plug is arranged at the optimal position. The optimum position where the laser light is emitted or the spark plug is inserted is set based on, for example, ignition conditions such as an ejection pattern of a fuel or an oxidant into the combustor liner or the position where an optimum fuel-oxidant mixture for ignition is made.

As thermal power generation plants including such a combustor continue to improve their efficiency, a supercritical $CO_2$ gas turbine facility including a combustor with a diffusion combustion system that burns a fuel and an oxidant in a supercritical $CO_2$ atmosphere is being considered. In this supercritical $CO_2$ gas turbine facility, a portion of a working fluid discharged from a turbine is circulated to the combustor as a circulating gas.

In this supercritical $CO_2$ gas turbine facility, a wall thickness of a combustor casing as a pressure vessel also becomes thick because of the operating conditions in an ultra-high pressure environment. Further, between the combustor casing and the combustor liner, there is provided a circulating gas flow path for circulating the circulating gas.

From the viewpoint of preventing leakage of a working fluid or the like in the combustor operated in such an ultra-high pressure environment, a laser ignition device that enables non-contact ignition is being considered as the ignition device.

In a conventional laser ignition device, the laser light is focused by a lens and emitted into the combustor liner through a pressure-resistant glass. Even in this case, the laser light is emitted to the optimum position in the combustor liner from the direction vertical to the center axis direction of the combustor liner formed of a cylinder body.

In the combustor of a gas turbine, the optimum position in the center axis direction where the laser light is emitted and the optimum position in the center axis direction where the ignition plug is arranged vary depending on the ignition conditions. However, it is impossible to change the position in the center axis direction where the laser light is emitted and the position in the center axis direction where the ignition plug is arranged according to the ignition conditions in the above-described conventional combustor. Therefore, when the ignition conditions are changed, it is sometimes impossible to perform optimum ignition.

Further, in the supercritical $CO_2$ gas turbine facility, the focal length of the lens is long because the thick-walled combustor casing and the circulating gas flow path are provided. Therefore, the laser output needs to be increased to ensure reliable ignition. Increasing the laser output increases the risk of damage to the pressure-resistant glass.

DETAILED DESCRIPTION

There will be explained embodiments of the present invention below with reference to the drawings.

In one embodiment, a burner with a torch ignition mechanism includes: a tubular torch part extending in an axial direction; and a main fuel-main oxidant supply part provided on one end side of the torch part and formed in an annular shape on an outer periphery of the torch part.

Then, the torch part includes: a torch part casing; a torch combustor liner provided in the torch part casing and burns a fuel and an oxidant; a torch fuel supply part that supplies a fuel into the torch combustor liner; a torch oxidant supply part that supplies an oxidant into the torch combustor liner; an ignition device that ignites a fuel-air mixture inside the torch combustor liner; a combustion gas pipe that extends from the torch combustor liner toward one end side of the torch part, is arranged at the center of the torch part, and leads a combustion gas generated in the torch combustor liner to one end side of the torch part; and a cooling medium passage that is formed in an annular shape between the torch combustor liner and the combustion gas pipe and the torch part casing and leads a cooling medium toward one end side of the torch part.

Further, the main fuel-main oxidant supply part includes a main fuel supply passage formed in an annular shape on the outer periphery of the torch part, and a main oxidant supply passage formed in an annular shape on an outer periphery of the main fuel supply passage.

Figure 1:
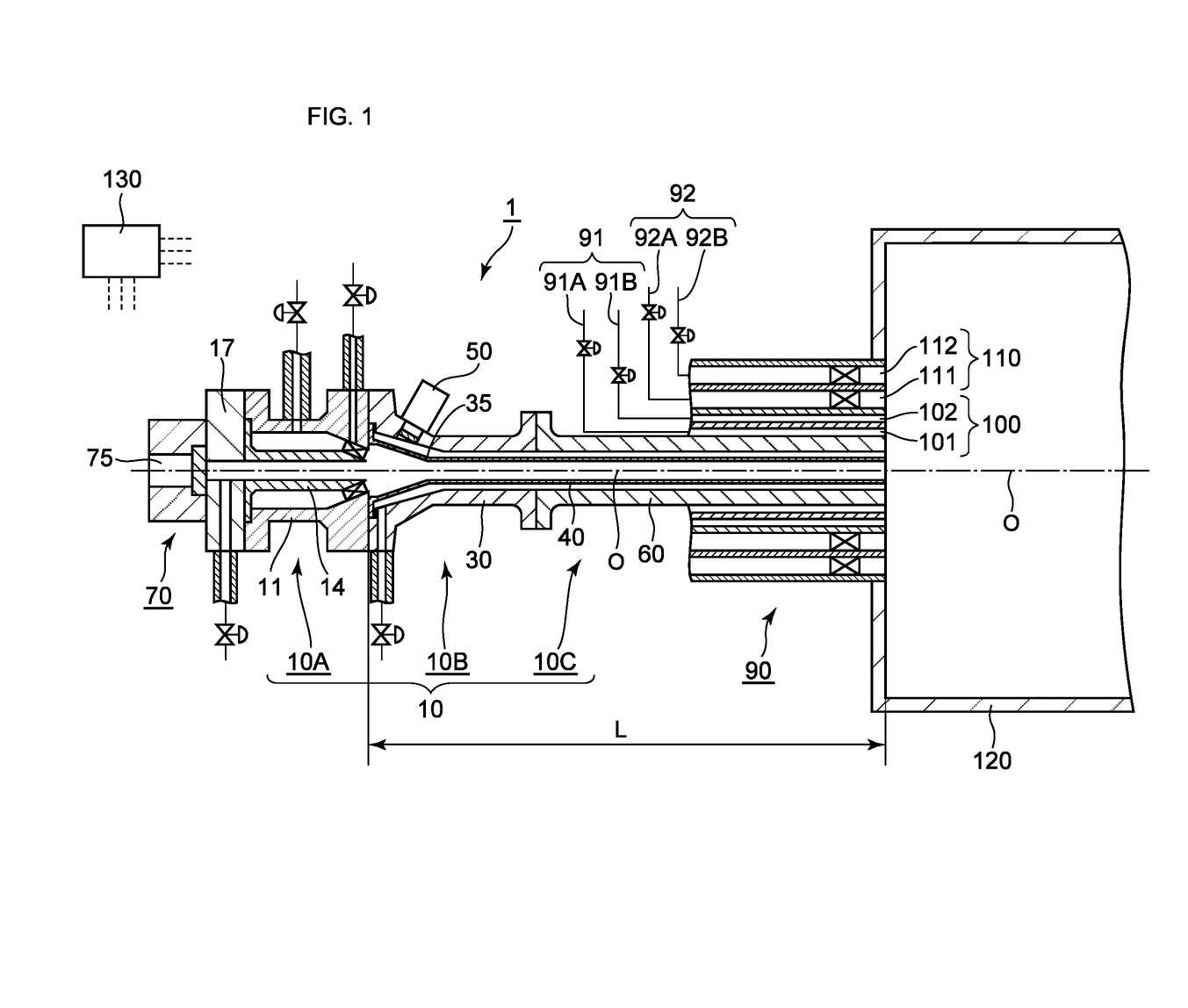
FIG. 1 is a view schematically illustrating a longitudinal cross section of a burner in an embodiment.
Figure 2:
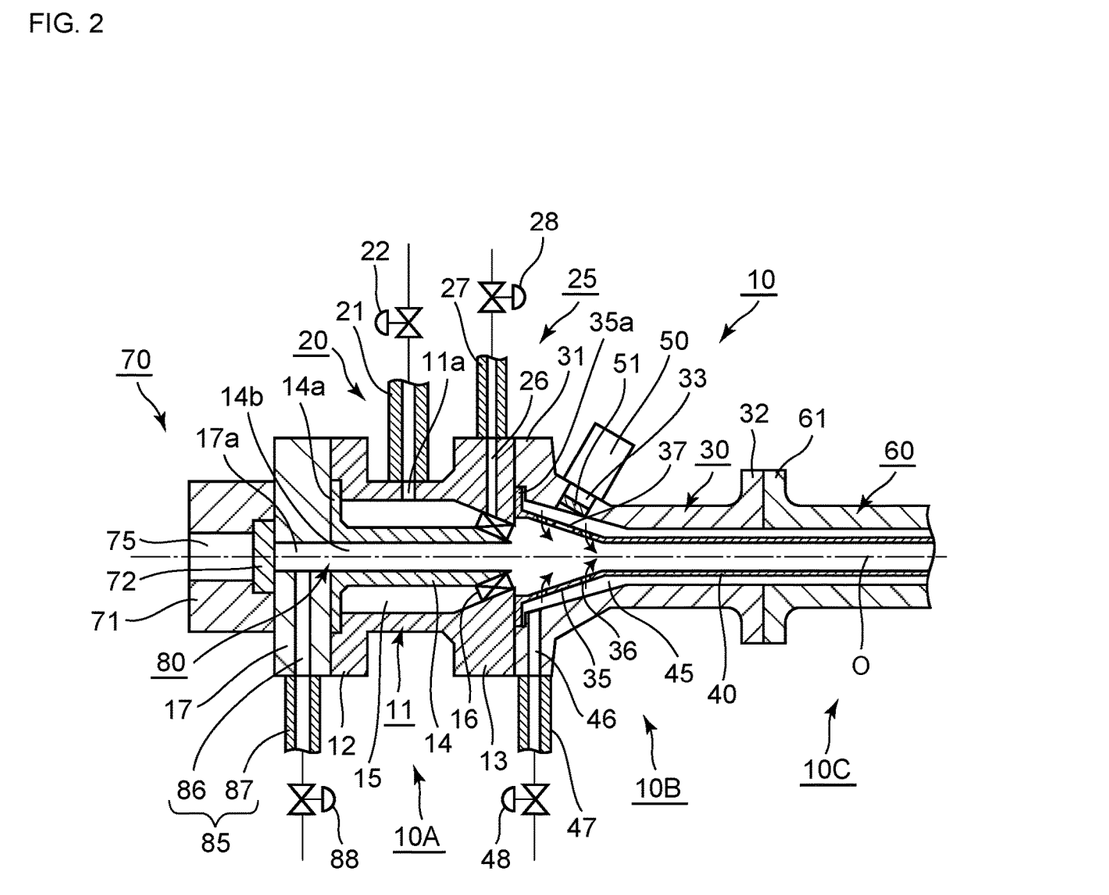
FIG. 2 is a view schematically illustrating a longitudinal cross section of a torch part and a flame detection mechanism in the burner in the embodiment in an enlarged manner.
Figure 3:
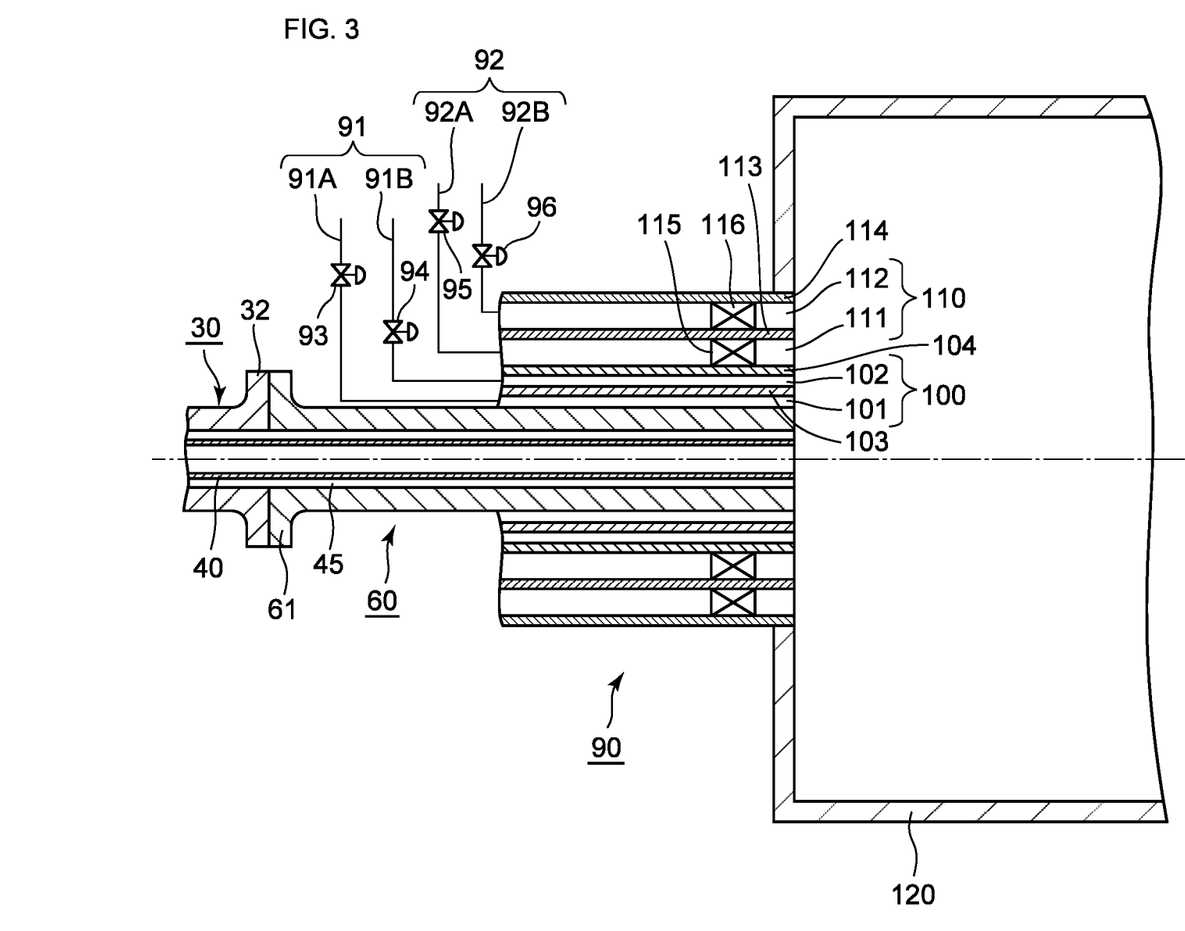
FIG. 3 is a view schematically illustrating a longitudinal cross section of a part of the torch part and a main fuel-main oxidant supply part in the burner in the embodiment in an enlarged manner.

FIG. 1 is a view schematically illustrating a longitudinal cross section of a burner 1 in an embodiment. FIG. 2 is a view schematically illustrating a longitudinal cross section of a torch part 10 and a flame detection mechanism 70 in the burner 1 in the embodiment in an enlarged manner. FIG. 3 is a view schematically illustrating a longitudinal cross section of a part of the torch part 10 and a main fuel-main oxidant supply part 90 in the burner 1 in the embodiment in an enlarged manner. FIG. 3 also illustrates a main combustor liner 120 to which the burner 1 is to be attached. The burner 1 functions as a burner with a torch ignition mechanism.

The burner 1 supplies a fuel and an oxidant into the main combustor liner 120 to which the burner 1 is to be attached. Further, the burner 1 has a function of supplying an ignition source (combustion gas) for igniting a mixture of the supplied fuel and oxidant. One end side of the burner 1 is attached to the main combustor liner 120.

As illustrated in FIG. 1, the burner 1 includes the torch part 10, the flame detection mechanism 70, and the main fuel-main oxidant supply part 90. Further, the burner 1 also includes a control device 130 that executes an operation control of the burner 1.

The torch part 10, the flame detection mechanism 70, and the main fuel-main oxidant supply part 90 are arranged with a center axis O set as the center axis. In other words, the torch part 10, the flame detection mechanism 70, and the main fuel-main oxidant supply part 90 are arranged coaxially.

There is first explained a configuration of the torch part 10.

The torch part 10 generates a combustion gas and leads the combustion gas into the main combustor liner 120 as an ignition source. The torch part 10 is formed of a tubular member extending in the direction of the center axis O. The direction of the center axis O is simply referred to as an axial direction below.

As illustrated in FIG. 1 and FIG. 2, the torch part 10 includes a first torch forming portion 10A having a function of mainly supplying a fuel and an oxidant, a second torch forming portion 10B having a function of mainly burning the fuel and the oxidant, and a third torch forming portion 10C having a function of mainly leading a combustion gas into the main combustor liner 120.

The respective torch forming portions are arranged in the order of the first torch forming portion 10A, the second torch forming portion 10B, and the third torch forming portion 10C toward the main fuel-main oxidant supply part 90 side (one end side of the burner 1).

As illustrated in FIG. 2, the first torch forming portion 10A includes a first torch part casing 11, a torch oxidant supply part 20, and a torch fuel supply part 25.

The first torch part casing 11 is formed of a cylinder body with flange portions 12 and 13 at both ends, for example. The both ends of the first torch part casing 11 are open. A sealing plate 17 is provided at an end portion of the first torch part casing 11 on a flame detection part 75 side (the other end side of the burner 1). The sealing plate 17 is attached to the flange portion 12.

Inside the first torch part casing 11, a cylinder body 14 having both ends thereof opened is provided along the axial direction. As illustrated in FIG. 2, the cylinder body 14 includes a flange portion 14a projecting to the radially outer side in an annular shape, for example, at the end portion on the flame detection part 75 side. Further, the cylinder body 14 is fixed by the flange portion 14a being sandwiched between the flange portion 12 and the sealing plate 17.

Here, the radially outer side is a side in a direction vertical to the center axis O and away from the center axis O.

The torch oxidant supply part 20 supplies an oxidant into the torch combustor liner 35 provided in the second torch forming portion 10B. The torch oxidant supply part 20 includes a torch oxidant supply passage 15 and a torch oxidant supply pipe 21.

The torch oxidant supply passage 15 leads the oxidant to the torch combustor liner 35. The torch oxidant supply passage 15 is formed of an annular passage formed in the axial direction between the cylinder body 14 and the first torch part casing 11. An end portion of the torch oxidant supply passage 15 on the flame detection part 75 side is sealed by the flange portion 14a of the cylinder body 14, for example.

At the outlet of the torch oxidant supply passage 15, there is provided a swirler 16 that swirls the flow of the oxidant ejected into the torch combustor liner 35.

The torch oxidant supply pipe 21 supplies an oxidant supplied from an oxidant supply source (not illustrated) to the torch oxidant supply passage 15. One end of the torch oxidant supply pipe 21 is joined to a sidewall so as to communicate with a through hole 11a formed in the sidewall of the first torch part casing 11, for example. The oxidant is supplied from the torch oxidant supply pipe 21 to the torch oxidant supply passage 15 through the through hole 11a. The torch oxidant supply pipe 21 is provided with a flow rate regulating valve 22 that regulates the flow rate of the oxidant.

Examples of the oxidant include oxygen, a mixed gas consisting of oxygen mixed with carbon dioxide, a mixed gas consisting of oxygen mixed with water vapor, air, and so on. When the burner 1 is provided in a supercritical $CO_2$ gas turbine facility, for example, the oxidant pressurized to the critical pressure or higher is supplied to the torch oxidant supply pipe 21.

The torch fuel supply part 25 supplies a fuel into the torch combustor liner 35. The torch fuel supply part 25 includes a torch fuel introduction passage 26 and a torch fuel supply pipe 27.

The torch fuel introduction passage 26 introduces the fuel into the swirler 16 provided at the outlet of the torch oxidant supply passage 15, for example. Here, there is explained one example of the configuration of the torch fuel introduction passage 26 that introduces the fuel into the swirler 16, but the present invention is not limited to this configuration. The torch fuel introduction passage 26 may be configured to directly eject the fuel into the torch combustor liner 35, for example.

The torch fuel introduction passage 26 is formed in the flange portion 13 of the first torch part casing 11 as illustrated in FIG. 2, for example. The torch fuel introduction passage 26 is formed of a through hole passing through from the outer surface of the flange portion 13 to the torch oxidant supply passage 15 at the position where the swirler 16 is provided, for example.

The torch fuel supply pipe 27 supplies a fuel supplied from a fuel supply source (not illustrated) to the torch fuel introduction passage 26. One end of the torch fuel supply pipe 27 is joined to the outer surface of the flange portion 13 so as to communicate with the torch fuel introduction passage 26. The torch fuel supply pipe 27 is provided with a flow rate regulating valve 28 that regulates the flow rate of the fuel.

The configuration of the torch fuel supply part 25 is not limited to the above-described configuration. For example, the torch fuel supply part 25 may be configured so that the fuel supplied from the torch fuel supply pipe 27 can be evenly supplied to the torch oxidant supply passages 15 over the circumferential direction. Specifically, a plurality of the torch fuel supply parts 25 may be provided radially in the circumferential direction of the flange portion 13.

As the fuel, for example, a hydrocarbon such as methane or natural gas is used. Further, as the fuel, for example, a coal gasification gas fuel containing carbon monoxide, hydrogen, and so on can also be used. Further, as the fuel, for example, hydrogen can also be used.

The second torch forming portion 10B includes a second torch part casing 30, the torch combustor liner 35, a combustion gas pipe 40, a cooling medium passage 45, and an ignition device 50.

The second torch part casing 30 is formed of a cylinder body with flange portions 31 and 32 at both ends, for example. The both ends of the second torch part casing 30 are open. The flange portion 31 is joined to the flange portion 13 of the first torch part casing 11. The flange portion 32 is coupled to a flange portion 61 of a third torch part casing 60 to be described later.

The torch combustor liner 35 burns the fuel supplied from the torch fuel introduction passage 26 and the oxidant supplied from the torch oxidant supply passage 15. Here, when the main combustor liner 120 has a function as a main combustion chamber, the torch combustor liner 35 has a function as a secondary combustion chamber.

The torch combustor liner 35 is provided in the second torch part casing 30 along the axial direction. As illustrated in FIG. 2, the torch combustor liner 35 is, for example, a truncated cone-shaped cylinder body having both ends open. The torch combustor liner 35 is configured so that a cross-sectional area of a flow path becomes smaller toward the tip side (downstream side).

The torch combustor liner 35 includes a flange portion 35a projecting to the radially outer side in an annular shape, for example, at the end portion on the first torch part casing 11 side (upstream side) as illustrated in FIG. 2. The torch combustor liner 35 is fixed by the flange portion 35a being sandwiched between the flange portion 31 and the flange portion 13.

Further, in the torch combustor liner 35, there are formed a plurality of through holes 36 intended for introducing a cooling medium into the torch combustor liner 35 from the cooling medium passage 45. In FIG. 2, the flow of the cooling medium introduced into the torch combustor liner 35 through the through hole 36 is indicated by an arrow.

The combustion gas pipe 40 leads the combustion gas generated in the torch combustor liner 35 to one end side of the torch part (one end side of the burner 1). The combustion gas pipe 40 is connected to the downstream end of the torch combustor liner 35. The combustion gas pipe 40 extends from the downstream end of the torch combustor liner 35 toward one end side of the torch part.

The combustion gas pipe 40 is arranged at the center of the torch part 10, and is arranged coaxially with the cylinder body 14 and the torch combustor liner 35. The combustion gas pipe 40 is formed of, for example, a circular pipe, for example.

The cooling medium passage 45 is formed of an annular passage formed in the axial direction between the torch combustor liner 35 and the second torch part casing 30 and between the combustion gas pipe 40 and the second torch part casing 30. The cooling medium passage 45 extends from the upstream side of the torch combustor liner 35 toward one end side of the torch part. The cooling medium supplied to the upstream portion of the cooling medium passage 45 is led to one end side of the torch part by the cooling medium passage 45.

The end portion of the cooling medium passage 45 on the upstream side is closed by, for example, the flange portion 35a of the torch combustor liner 35.

Further, the second torch forming portion 10B includes a cooling medium introduction passage 46 and a cooling medium supply pipe 47 intended for supplying the cooling medium to the cooling medium passage 45.

The cooling medium introduction passage 46 supplies the cooling medium to the cooling medium passage 45. The cooling medium introduction passage 46 is formed in the flange portion 31 of the second torch part casing 30 as illustrated in FIG. 2, for example. The cooling medium introduction passage 46 is formed of, for example, a through hole passing through from the outer surface of the flange portion 31 to the cooling medium passage 45

The cooling medium supply pipe 47 supplies a cooling medium supplied from a cooling medium supply source (not illustrated) to the cooling medium introduction passage 46. One end of the cooling medium supply pipe 47 is joined to the outer surface of the flange portion 31 so as to communicate with the cooling medium introduction passage 46. The cooling medium supply pipe 47 is provided with a flow rate regulating valve 48 that regulates the flow rate of the cooling medium.

As the cooling medium, for example, carbon dioxide, water vapor, air, or the like is used. For example, when the burner 1 is provided in the supercritical $CO_2$ gas turbine facility, the cooling medium pressurized to the critical pressure or higher is supplied to the cooling medium supply pipe 47.

The ignition device 50 ignites the fuel-air mixture inside the torch combustor liner 35. The ignition device 50 is arranged to be able to ignite the mixture inside the torch combustor liner 35 through a through hole 33 formed in the second torch part casing 30. The through hole 33 is formed in the second torch part casing 30 positioned at the outer periphery of the torch combustor liner 35.

The ignition device 50 is provided in the second torch part casing 30 positioned at the outer periphery of the torch combustor liner 35, as illustrated in FIG. 2, for example.

As the ignition device 50, there is used a laser ignition device that ignites by laser light, a spark ignition device that ignites by an ignition plug, or the like. The laser ignition device is advantageous because it enables non-contact ignition or other reasons. Further, when the burner 1 is provided in the supercritical $CO_2$ gas turbine facility, where the pressure is higher than that in a combustor of a conventional gas turbine, the laser ignition device is preferably employed in consideration of leakage of a combustion gas or the like.

In this embodiment, there is explained one example where the laser ignition device is provided as the ignition device 50.

At the end of the through hole 33 on the cooling medium passage 45 side, a laser transmission member 51 is provided so as to close the through hole 33. The laser transmission member 51 is formed of, for example, a flat plate-shaped heat-resistant glass or the like that transmits laser light. A flat plate-shaped heat-resistant resin or the like that transmits laser light may also be used as the laser transmission member 51.

Here, a through hole 37 used for emitting the laser light to the inside of the torch combustor liner 35 is formed at a position of the torch combustor liner 35 facing the through hole 33. The laser light emitted from the ignition device 50 is emitted to the inside of the torch combustor liner 35 through the through hole 33, the laser transmission member 51, and the through hole 37.

Further, the cooling medium flowing through the cooling medium passage 45 comes into contact with one surface of the laser transmission member 51. Therefore, this cooling medium cools the torch combustor liner 35, the combustion gas pipe 40, and the laser transmission member 51, and at the same time, removes foreign matters adhering to one surface of the laser transmission member 51.

Here, in the torch part 10, the ignition device 50 is provided in the second torch part casing 30. Then, the laser light is emitted to the inside of the torch combustor liner 35 from the side of the second torch forming portion 10B at a predetermined angle with respect to the center axis O through the through hole 33 in the second torch part casing 30 and the through hole 37 in the torch combustor liner 35. The ignition conditions in the torch combustor liner 35 are nearly constant, and thus, the optimum position in the center axis direction to be irradiated with the laser light is a fixed position. Therefore, optimal ignition can be performed even if the laser light is emitted from the side of the second torch forming portion 10B.

Further, the wall thickness of the second torch part casing 30 is thinner than that of a casing of a main combustor where the main combustor liner 120 is housed. Further, the focal length of a lens that focuses the laser in the ignition device 50 is short. Therefore, the laser output in the ignition device 50 is lower than that of a laser ignition device in a conventional main combustor. As a result, the laser transmission member 51 is not damaged by the laser light.

The third torch forming portion 10C includes the third torch part casing 60, the combustion gas pipe 40, and the cooling medium passage 45.

The third torch part casing 60 is formed of a cylinder body with a flange portion 61 at one end, for example. The third torch part casing 60 extends to the outlet of the burner 1 in the axial direction. Both ends of the third torch part casing 60 are open. The flange portion 61 is coupled to the flange portion 32 of the second torch part casing 30.

The torch part casing is formed by the third torch part casing 60, the first torch part casing 11, and the second torch part casing 30 described above.

In the third torch part casing 60, the above-described combustion gas pipe 40 extends to the outlet of the burner 1 in the axial direction. That is, the combustion gas pipe 40 extends from the downstream end of the torch combustor liner 35 to the outlet of the burner 1. The combustion gas pipe 40 is open at the outlet of the burner 1.

Here, there is explained one example where the outlet of the combustion gas pipe 40 is formed to have a straight pipe shape parallel to the axial direction, but the outlet is not limited to this form. The outlet of the combustion gas pipe 40 may be formed so that the ejected combustion gas spreads to the radially outer side. This causes the combustion gas flow to spread to the side where the fuel and the oxidant are supplied.

For example, a swirler may be provided at the outlet of the combustion gas pipe 40. Further, for example, the outlet of the combustion gas pipe 40 may be set to an annular enlarged passage. The shape of the outlet of the combustion gas pipe 40 may be set to have a double-pipe structure with an enlarged pipe. In other words, the outlet of the combustion gas pipe 40 may be formed with an enlarged pipe whose cross-sectional area gradually expands, and a cone-shaped member with a diameter smaller than that of the enlarged pipe may be arranged inside the enlarged pipe with its apex facing upstream to form an annular enlarged passage. This allows the combustion gas to spread to the radially outer side without reducing an ejection speed of the combustion gas.

The cooling medium passage 45 described above extends to the outlet of the burner 1 in the axial direction between the third torch part casing 60 and the combustion gas pipe 40. That is, the cooling medium passage 45 extends from the upstream side of the torch combustor liner 35 to the outlet of the burner 1. The cooling medium passage 45 is open at the outlet of the burner 1.

Next, there is explained a configuration of the flame detection mechanism 70.

The flame detection mechanism 70 detects a flame formed in the torch combustor liner 35 or a flame formed in the main combustor liner 120. The flame detection mechanism 70 is provided on the other end side of the torch part 10 with respect to the torch combustor liner 35.

The flame detection mechanism 70 includes a detection part casing 71, a flame detection part 75, a flame detection passage 80, a light transmission member 72, and a purification medium supply portion 85.

The flame detection part 75 detects a flame formed in the torch combustor liner 35 or a flame formed in the main combustor liner 120. The flame detection part 75 is provided on the other end side of the torch part 10. For example, as illustrated in FIG. 2, the flame detection part 75 is provided inside the detection part casing 71 connected to the end surface of the sealing plate 17 on the side opposite to the first torch part casing 11 side.

The flame detection part 75 is formed of an optical flame detection device that detects infrared rays, visible light, ultraviolet rays, or the like emitted from the flame.

The flame detection passage 80 is a passage for detecting a flame formed in the torch combustor liner 35 or a flame formed in the main combustor liner 120 in the flame detection part 75. The flame detection passage 80 is a passage that communicates with the inside of the torch combustor liner 35 and extends to the flame detection part 75 side.

Specifically, the flame detection passage 80 includes a through portion 14b inside the cylinder body 14 and a through hole 17a formed in the center of the sealing plate 17 as illustrated in FIG. 2. The through portion 14b communicates with the inside of the torch combustor liner 35. The through hole 17a communicates with the through portion 14b. The through portion 14b and the through hole 17a are formed coaxially with the center axis O as the center axis.

Here, the flame detection passage 80 intended for detecting a flame formed in the torch combustor liner 35 is formed of the through hole 17a and the through portion 14b as described above. In this case, the light from the flame formed in the torch combustor liner 35 passes through the through portion 14b and the through hole 17a to enter the flame detection part 75.

On the other hand, the flame detection passage 80 intended for detecting a flame formed in the main combustor liner 120 is formed of the through portion 14b, the through hole 17a, the torch combustor liner 35, and the combustion gas pipe 40. In this case, the light from the flame formed in the main combustor liner 120 passes through the inside of the combustion gas pipe 40, the inside of the torch combustor liner 35, the through portion 14b, and the through hole 17a to enter the flame detection part 75.

Here, the combustion gas pipe 40, the torch combustor liner 35, the through portion 14b, the through hole 17a, and the flame detection part 75 are formed coaxially with the center axis O as the center axis.

The ignition device 50 is arranged at a position that does not interfere with the flame detection in the above-described flame detection passage 80 as illustrated in FIG. 1 and FIG. 2.

Here, in a combustor of a gas turbine operated over a wide operating range, the flame sometimes moves in the center axis direction depending on the operating conditions. Thus, by detecting the flame formed in the main combustor liner 120 from the upstream side in the axial direction, the flame can be reliably detected even when the flame fluctuates in the axial direction, for example.

The light transmission member 72 transmits the light from the flame to the flame detection part 75 side. The light transmission member 72 is provided between the flame detection part 75 and the flame detection passage 80, for example. The light transmission member 72 is formed of a flat plate-shaped heat-resistant glass or the like that transmits the light from the flame. A flat plate-shaped heat-resistant resin or the like that transmits the light from the flame may also be used as the light transmission member 72.

The purification medium supply portion 85 supplies a purification medium that purifies the light transmission member 72 to the flame detection passage 80. Specifically, the purification medium supply portion 85 supplies the purification medium, which is intended for removing foreign matters adhering to the surface of the light transmission member 72 on the flame detection passage 80 side, to the flame detection passage 80. The purification medium also has a function of cooling the light transmission member 72. The purification medium supply portion 85 includes a purification medium introduction passage 86 and a purification medium supply pipe 87.

The purification medium introduction passage 86 introduces the purification medium into the flame detection passage 80. The purification medium introduction passage 86 is formed in the sealing plate 17, for example, as illustrated in FIG. 2. The purification medium introduction passage 86 is formed of, for example, a through hole passing through from the outer surface of the sealing plate 17 to the flame detection passage 80. The outlet of the purification medium introduction passage 86 is preferably close to the light transmission member 72.

The purification medium supply pipe 87 supplies a purification medium supplied from a purification medium supply source (not illustrated) to the purification medium introduction passage 86. One end of the purification medium supply pipe 87 is joined to the outer surface of the sealing plate 17 so as to communicate with the purification medium introduction passage 86. The purification medium supply pipe 87 is provided with a flow rate regulating valve 88 that regulates the flow rate of the purification medium.

As the purification medium, for example, carbon dioxide, water vapor, air, or the like is used. For example, when the burner 1 is provided in the supercritical $CO_2$ gas turbine facility, the purification medium pressurized to the critical pressure or higher is supplied to the purification medium supply pipe 87.

Here, when the flame detection part 75 has a function of the light transmission member 72, the light transmission member 72 does not need to be provided. In this case, the purification medium supply portion 85 does not also need to be provided.

Next, there is explained a configuration of the main fuel-main oxidant supply part 90.

The main fuel-main oxidant supply part 90 supplies a fuel and an oxidant into the main combustor liner 120. As illustrated in FIG. 3, the main fuel-main oxidant supply part 90 includes a main fuel supply passage 100 and a main oxidant supply passage 110. The outlet end surface of the main fuel-main oxidant supply part 90 is formed to have a flat surface without unevenness, for example.

Further, the main fuel-main oxidant supply part 90 includes a main fuel supply pipe 91 that supplies the fuel to the main fuel supply passage 100 and a main oxidant supply pipe 92 that supplies the oxidant to the main oxidant supply passage 110.

The main fuel supply passage 100 supplies the fuel into the main combustor liner 120. The main fuel supply passage 100 is formed of an annular passage formed in the axial direction on the outer periphery of the torch part 10 on the main combustor liner 120 side.

The main fuel supply passage 100 includes a first main fuel supply passage 101 and a second main fuel supply passage 102, as illustrated in FIG. 3, for example. Further, the main fuel supply pipe 91 includes a first main fuel supply pipe 91A that supplies the fuel to the first main fuel supply passage 101 and a second main fuel supply pipe 91B that supplies the fuel to the second main fuel supply passage 102.

The first main fuel supply pipe 91A is provided with a flow rate regulating valve 93 that regulates the flow rate of the fuel. Further, the second main fuel supply pipe 91B is provided with a flow rate regulating valve 94 that regulates the flow rate of the fuel.

The first main fuel supply passage 101 and the second main fuel supply passage 102 are each formed of an annular passage formed between pipes arranged concentrically about the center axis O.

The first main fuel supply passage 101 is formed of an annular passage formed on the outer periphery of the torch part 10. Specifically, the first main fuel supply passage 101 is formed of an annular passage formed between the third torch part casing 60 and a pipe 103. The pipe 103 is arranged on the outer periphery of the third torch part casing 60. The first main fuel supply passage 101 communicates with the first main fuel supply pipe 91A.

The second main fuel supply passage 102 is formed of an annular passage formed on the outer periphery of the first main fuel supply passage 101. Specifically, the second main fuel supply passage 102 is formed of an annular passage formed between the pipe 103 and a pipe 104. The pipe 104 is arranged on the outer periphery of the pipe 103. The second main fuel supply passage 102 communicates with the second main fuel supply pipe 91B.

The main oxidant supply passage 110 supplies the oxidant into the main combustor liner 120. The main oxidant supply passage 110 is formed of an annular passage formed in the axial direction on the outer periphery of the main fuel supply passage 100.

The main oxidant supply passage 110 includes a first main oxidant supply passage 111 and a second main oxidant supply passage 112, as illustrated in FIG. 3, for example. Further, the main oxidant supply pipe 92 includes a first main oxidant supply pipe 92A that supplies the oxidant to the first main oxidant supply passage 111 and a second main oxidant supply pipe 92B that supplies the oxidant to the second main oxidant supply passage 112.

The first main oxidant supply pipe 92A is provided with a flow rate regulating valve 95 that regulates the flow rate of the oxidant. Further, the second main oxidant supply pipe 92B is provided with a flow rate regulating valve 96 that regulates the flow rate of the oxidant.

The first main oxidant supply passage 111 and the second main oxidant supply passage 112 are each formed of an annular passage formed between pipes arranged concentrically about the center axis O.

The first main oxidant supply passage 111 is formed of an annular passage formed on the outer periphery of the main fuel supply passage 100. Specifically, the first main oxidant supply passage 111 is formed of an annular passage formed between the pipe 104 and a pipe 113. The pipe 113 is arranged on the outer periphery of the pipe 104. The first main oxidant supply passage 111 communicates with the first main oxidant supply pipe 92A.

The second main oxidant supply passage 112 is formed of an annular passage formed on the outer periphery of the first main oxidant supply passage 111. Specifically, the second main oxidant supply passage 112 is formed of an annular passage formed between the pipe 113 and a pipe 114. The pipe 114 is arranged on the outer periphery of the pipe 113. The second main oxidant supply passage 112 communicates with the second main oxidant supply pipe 92B.

Here, for example, near the outlets of the first main oxidant supply passage 111 and the second main oxidant supply passage 112, there are provided swirlers 115, 116 that swirl the flow of the oxidant. For example, the swirling direction of the swirling flow formed by the swirler 115 is the same as that of the swirling flow formed by the swirler 116.

By providing the swirlers 115, 116, a recirculation zone by the swirling flow of the oxidant is formed in a combustion zone in the main combustor liner 120. This promotes mixing of the fuel and the oxidant in the combustion zone and forms a stable flame.

Here, there has been explained one example where a plurality of the main fuel supply passages 100 and a plurality of the main oxidant supply passages 110 are provided, but the present invention is not limited to this configuration. The main fuel supply passage 100 and the main oxidant supply passage 110 may be provided one by one.

Here, similarly to the previously-described torch fuel supply part 25, as the fuel, for example, a hydrocarbon such as methane or natural gas is used for the main fuel supply passage 100. Further, as the fuel, for example, a coal gasification gas fuel containing carbon monoxide, hydrogen, and so on can also be used. Further, as the fuel, for example, hydrogen can also be used.

Similarly to the previously-described torch oxidant supply part 20, as the oxidant, for example, oxygen, a mixed gas consisting of oxygen mixed with carbon dioxide, a mixed gas consisting of oxygen mixed with water vapor, air, or the like can be used for the main oxidant supply passage 110. When the burner 1 is provided in the supercritical $CO_2$ gas turbine facility, for example, the oxidant pressurized to the critical pressure or higher is supplied to the main oxidant supply passage 110.

The fuel to be supplied to the main fuel supply passage 100 may be the same as or different from the fuel to be supplied to the torch fuel supply part 25. The oxidant to be supplied to the main oxidant supply passage 110 may be the same as or different from the oxidant to be supplied to the torch oxidant supply part 20.

Next, there is explained a configuration of the control device 130.

Figure 4:
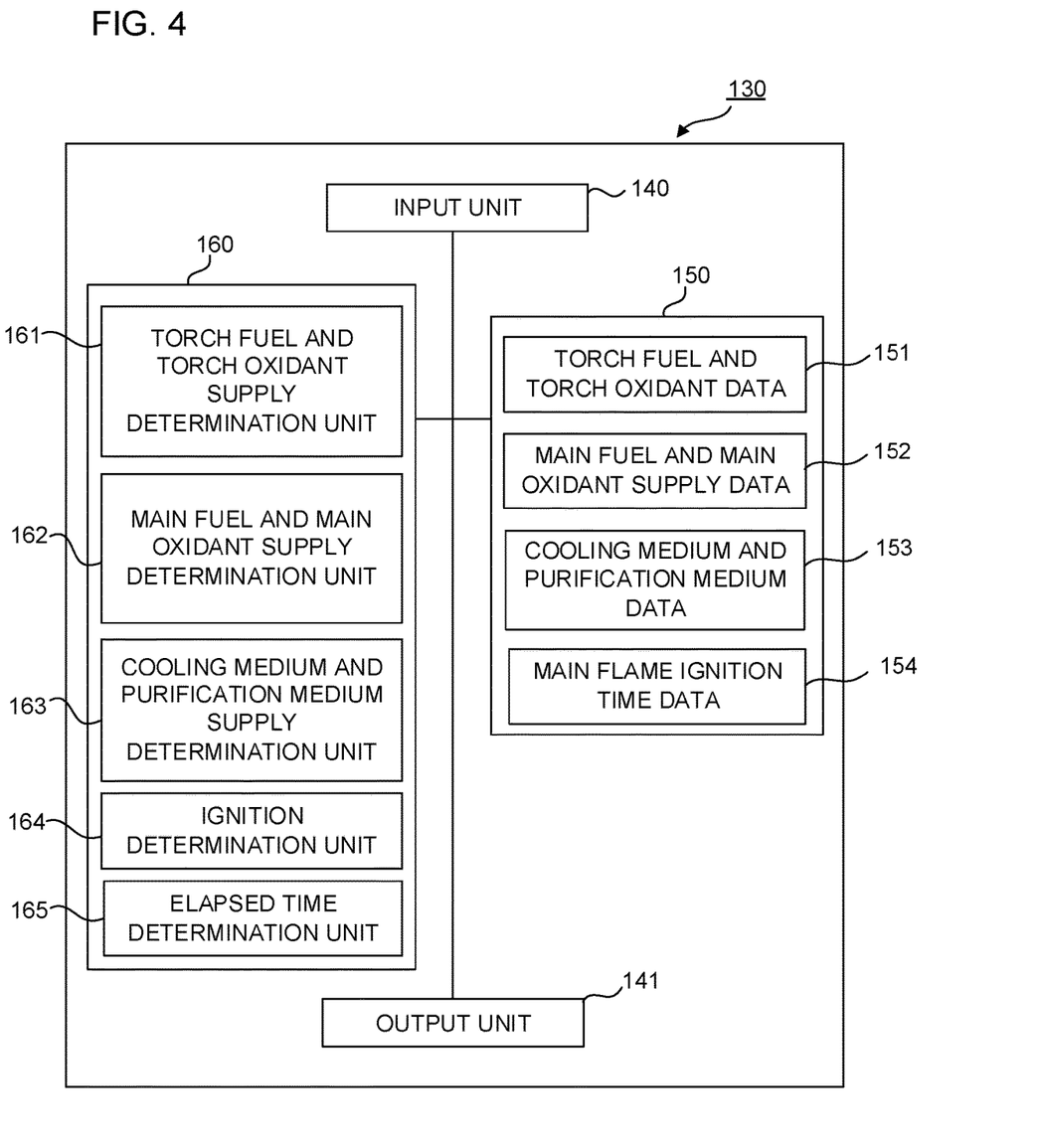
FIG. 4 is a block diagram illustrating a configuration of a control device that executes an operation method of the burner in the embodiment.

FIG. 4 is a block diagram illustrating the configuration of the control device 130 that executes the operation method of the burner 1 in the embodiment.

The control device 130 controls the respective flow rate regulating valves and the like to regulate the flow rate of the fuel, the flow rate of the oxidant, the flow rate of the cooling medium, the flow rate of the purification medium, and the like, which are supplied to the burner 1. The control device 130 includes an input unit 140, a storage unit 150, a calculation unit 160, and an output unit 141.

The input unit 140 receives, for example, an ignition request signal and a load request signal from an input device or the like, a detection signal from the flame detection part 75, a timer signal from a timer device or the like, detection signals from various detection parts, and the like.

The storage unit 150 is formed of a storage medium such as a read-only memory (ROM) or a random access memory (RAM). The storage unit 150 stores, for example, torch fuel and torch oxidant data 151 indicating the relationship between each operation process (operation elapsed time) and the flow rate of the fuel and the flow rate of the oxidant supplied into the torch combustor liner 35, main fuel and main oxidant data 152 indicating the relationship between each operation process (operation elapsed time) and the flow rate of the fuel and the flow rate of the oxidant supplied into the main combustor liner 120, and so on.

Further, the storage unit 150 stores, for example, cooling medium and purification medium data 153 indicating the relationship between each operation process (operation elapsed time) and the flow rate of the cooling medium supplied to the cooling medium passage 45 and the flow rate of the purification medium supplied to the flame detection passage 80, and so on. Further, the storage unit 150 stores, for example, main flame ignition time data 154 relating to the time until the combustion gas generated in the torch combustor liner 35 ignites the fuel-oxidant mixture in the main combustor liner 120, and so on.

Each of the above-described data is set in consideration of conditions such as pressure and temperature during each operation. Further, each of the above-described data also contains information such as a valve opening degree of the flow rate regulating valve corresponding to each flow rate.

The calculation unit 160 executes various pieces of calculation processing using, for example, an input signal from the input unit 140, a program or data stored in the storage unit 150, and so on. The calculation unit 160 includes a torch fuel and torch oxidant supply determination unit 161, a main fuel and main oxidant supply determination unit 162, a cooling medium and purification medium supply determination unit 163, an ignition determination unit 164, an elapsed time determination unit 165, and so on.

The elapsed time determination unit 165 determines an operation elapsed time from a timer signal from a timer device or the like. The operation elapsed time is, for example, the elapsed time from the time when the ignition device 50 is activated.

The torch fuel and torch oxidant supply determination unit 161 specifies the flow rate of the torch fuel and the flow rate of the torch oxidant to be supplied into the torch combustor liner 35 based on an ignition request signal (ignition start signal), a determination result in the elapsed time determination unit 165, and the torch fuel and torch oxidant data 151. Thereby, the torch fuel and torch oxidant supply determination unit 161 executes control for ignition in the torch part 10.

The torch fuel and torch oxidant supply determination unit 161 specifies the flow rate of the torch fuel and the flow rate of the torch oxidant to be supplied into the torch combustor liner 35 based on a determination result in the elapsed time determination unit 165 and the torch fuel and torch oxidant data 151.

Further, the torch fuel and torch oxidant supply determination unit 161 specifies the flow rate of the torch fuel and the flow rate of the torch oxidant to be supplied into the torch combustor liner 35 based on a determination result in the ignition determination unit 164, a determination result in the elapsed time determination unit 165, and the torch fuel and torch oxidant data 151. For example, when the ignition determination unit 164 determines that the fuel-oxidant mixture has been ignited in the main combustor liner 120, the torch fuel and torch oxidant supply determination unit 161 executes processing to stop the supply of the torch fuel and the supply of the torch oxidant based on a determination result in the elapsed time determination unit 165 and the torch fuel and torch oxidant data 151.

The main fuel and main oxidant supply determination unit 162 specifies the flow rate of the main fuel and the flow rate of the main oxidant to be supplied into the main combustor liner 120 based on a determination result in the ignition determination unit 164, a determination result in the elapsed time determination unit 165, and the main fuel and main oxidant data 152.

The cooling medium and purification medium supply determination unit 163 specifies the flow rate of the cooling medium to be supplied to the cooling medium passage 45 and the flow rate of the purification medium to be supplied to the flame detection passage 80 based on an ignition request signal (ignition start signal), a determination result in the elapsed time determination unit 165, and the cooling medium and purification medium data 153.

The ignition determination unit 164 determines whether or not a flame has been formed in the torch combustor liner 35 based on a detection signal from the flame detection part 75. Further, the ignition determination unit 164 determines, based on a determination result in the elapsed time determination unit 165 and the main flame ignition time data 154, whether or not it has reached the time until the combustion gas generated in the torch combustor liner 35 ignites the fuel-oxidant mixture in the main combustor liner 120.

Here, an ignition estimated time T until the combustion gas generated in the torch combustor liner 35 ignites the fuel-oxidant mixture in the main combustor liner 120 is defined as follows.

$$\text{Ignition estimated time } T = \alpha L/U \quad \text{Equation (1)}$$

As illustrated in FIG. 1, L is the length from the upstream end of the torch combustor liner 35 to the downstream end of the combustion gas pipe 40. U is the average flow velocity of the combustion gas flowing through the torch combustor liner 35 and the combustion gas pipe 40. $\alpha$ is a safety factor, and is set in a range of 1.2 to 1.5, for example. By setting the safety factor in this range, the time that the combustion gas generated in the torch combustor liner 35 can reliably reach the inside of the main combustor liner 120 can be defined as the ignition estimated time T.

The ignition estimated time T is the time obtained by multiplying the time (L/U) until the combustion gas generated in the torch combustor liner 35 reaches the outlet of the combustion gas pipe 40 (outlet of the burner 1) from the upstream end of the torch combustor liner 35 by the safety factor $\alpha$.

The output unit 141 outputs control signals from the calculation unit 160 to the flow rate regulating valves 22, 28, 48, 88, 93, 94, 95, and 96, the ignition device 50, and the like, for example. The output unit 141 is communicably connected to the flow rate regulating valves 22, 28, 48, 88, 93, 94, 95, and 96, the ignition device 50, and the like.

Here, pieces of the processing executed by the above-described control device 130 are performed by, for example, a computer device or the like.

Next, there are explained the operation of the burner 1 and the operation method of the burner 1.

Figure 5:
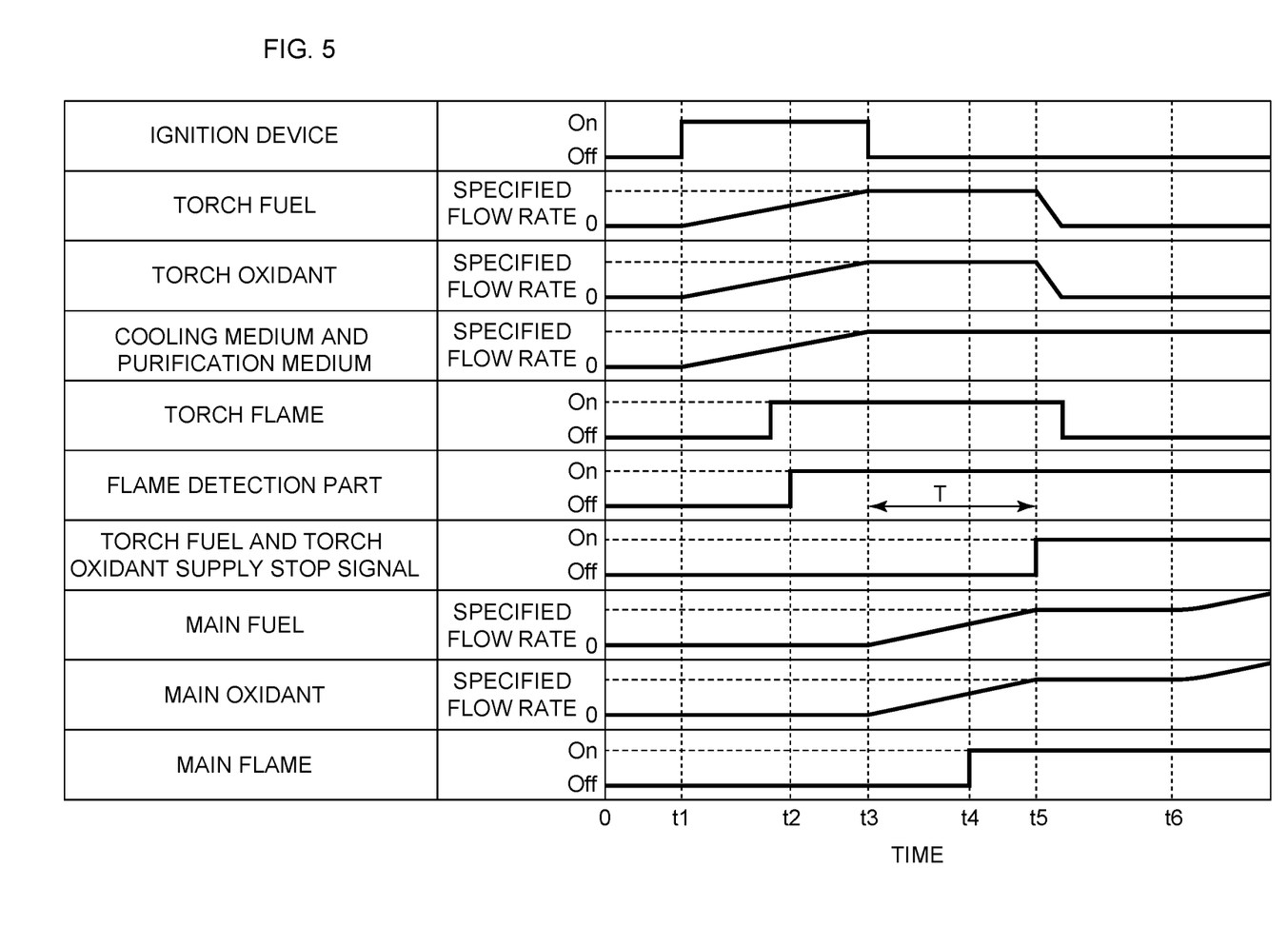
FIG. 5 is a time chart for explaining the operation method of the burner in the embodiment.
Figure 6:
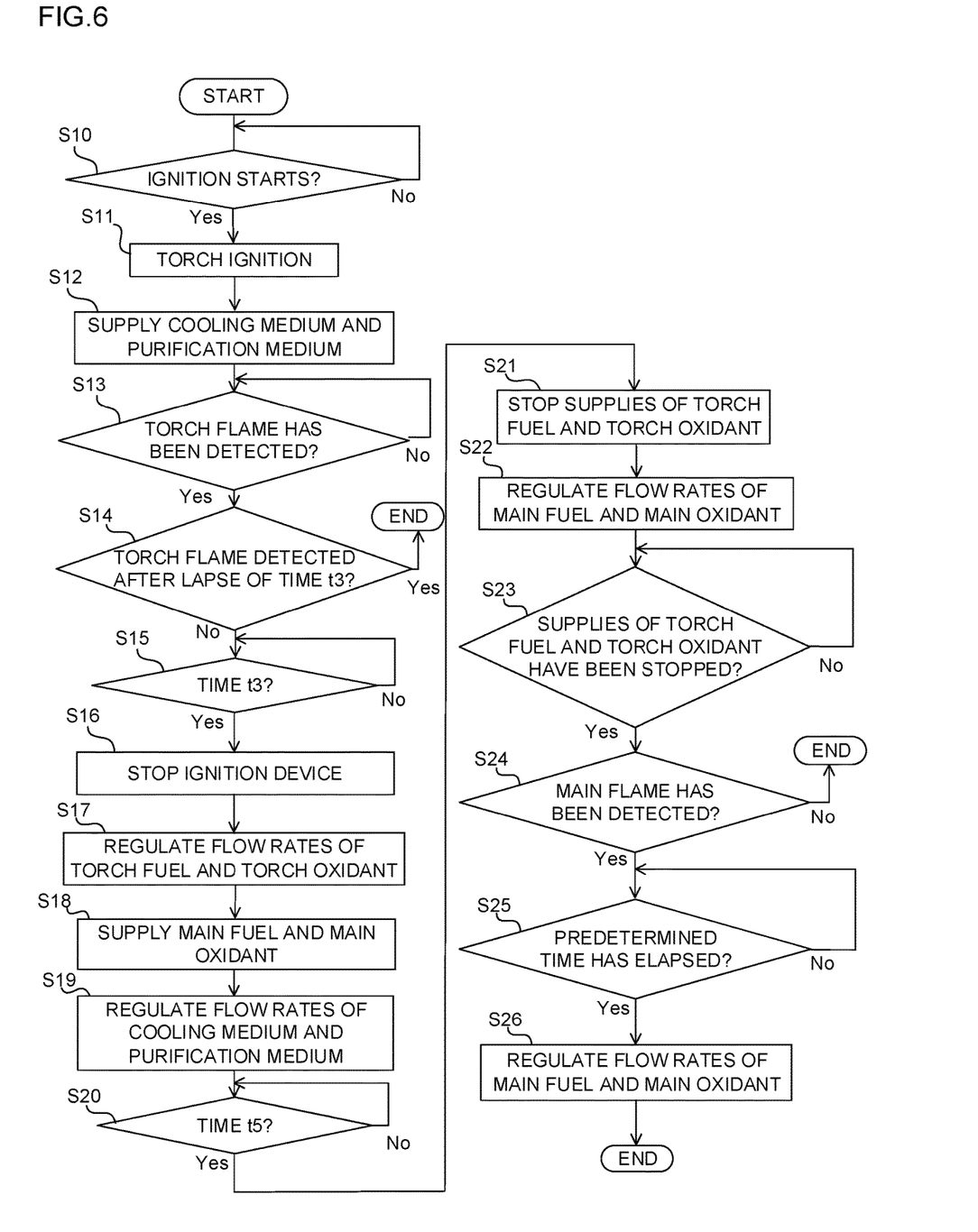
FIG. 6 is a flowchart for explaining the operation method of the burner in the embodiment.

FIG. 5 is a time chart for explaining the operation method of the burner 1 in the embodiment. FIG. 6 is a flowchart for explaining the operation method of the burner 1 in the embodiment.

In FIG. 5, the horizontal axis indicates a time. Regarding the time, the time when the ignition device 50 is activated is set to a time t1. In FIG. 5, the vertical axis indicates control items, and so on.

Here, there is explained the time from when the ignition device 50 is activated (time t1) to when a turbine load begins to increase (a time t6).

As illustrated in FIG. 6, the torch fuel and torch oxidant supply determination unit 161 in the control device 130 determines whether or not an ignition start signal has been input to the input unit 140 (Step S10).

When determining that the ignition start signal was not input in the determination at Step S10 (No at Step S10), the torch fuel and torch oxidant supply determination unit 161 executes the processing at Step S10 again.

When determining that the ignition start signal has been input in the determination at Step S10 (Yes at Step S10), the torch fuel and torch oxidant supply determination unit 161 executes control for ignition in the torch part 10 (Step S11).

Further, when determining that the ignition start signal has been input in the determination at Step S10 (Yes at Step S10), the torch fuel and torch oxidant supply determination unit 161 outputs information on the above determination to the cooling medium and purification medium supply determination unit 163.

Then, the cooling medium and purification medium supply determination unit 163 executes control for supplying the cooling medium and the purification medium (Step S12).

The cooling medium and purification medium supply determination unit 163 may determine whether or not the ignition start signal has been input at Step S10 and execute the processing at Step S12 based on the determination.

The processing at Step S11 and the processing at Step S12 are processing executed at the time t1 (when the ignition device 50 is activated) and during the period from the time t1 to the time t3 illustrated in FIG. 5.

At Step S11, the torch fuel and torch oxidant supply determination unit 161 outputs a signal for activating the ignition device 50 to the output unit 141.

The output unit 141 outputs the signal from the torch fuel and torch oxidant supply determination unit 161 to the ignition device 50. Thereby, as illustrated in FIG. 5, the ignition device 50 is activated to emit laser light to the inside of the torch combustor liner 35 via the through hole 33, the laser transmission member 51, and the through hole 37.

Further, at Step S11, the torch fuel and torch oxidant supply determination unit 161 refers to the torch fuel and torch oxidant data 151 to specify the flow rate of the fuel to be supplied to the torch fuel introduction passage 26 and the flow rate of the oxidant to be supplied to the torch oxidant supply passage 15. Then, the torch fuel and torch oxidant supply determination unit 161 outputs a signal for controlling the flow rate regulating valve 28 and the flow rate regulating valve 22 to the output unit 141.

The output unit 141 outputs the signal from the torch fuel and torch oxidant supply determination unit 161 to the flow rate regulating valve 28 and the flow rate regulating valve 22. Thereby, the opening degrees of the flow rate regulating valve 28 and the flow rate regulating valve 22 are adjusted.

Then, the fuel of a predetermined flow rate is supplied to the outlet side (for example, the inside of the swirler 16) in the torch oxidant supply passage 15 via the torch fuel supply pipe 27 and the torch fuel introduction passage 26, and is supplied into the torch combustor liner 35 together with the oxidant. Further, the oxidant of a predetermined flow rate is supplied into the torch combustor liner 35 via the torch oxidant supply pipe 21, the through hole 11a, and the torch oxidant supply passage 15. As illustrated in FIG. 5, the fuel flow rate and the oxidant flow rate are gradually increased to reach the specified flow rates at the time t3.

In the process of increasing the fuel flow rate and the oxidant flow rate, as illustrated in FIG. 5, the fuel-oxidant mixture is ignited in the torch combustor liner 35 to form a torch flame. Here, there is explained one example where a flame is formed before reaching the time t2. The flame formed in the torch combustor liner 35 is referred to as a torch flame below.

Here, the flow rates of the fuel and the oxidant to be supplied into the torch combustor liner 35 are set so that the temperature of the combustion gas at the outlet of the combustion gas pipe 40 becomes 800° C. or higher. Therefore, the flow rates of the fuel and the oxidant to be supplied into the torch combustor liner 35 are set considering the temperature or flow rate of the cooling medium flowing into the main combustor liner 120 from the cooling medium passage 45, the temperature or flow rate of the purification medium flowing into the main combustor liner 120 from the flame detection passage 80, the heat loss when the combustion gas flows through the combustion gas pipe 40, or the like.

Here, there is explained the reason why the temperature of the combustion gas at the outlet of the combustion gas pipe 40 is set to 800° C. or higher.

This combustion gas is composed of the combustion gas generated by the combustion of the fuel and the oxidant in the torch combustor liner 35, the cooling medium that flows into the torch combustor liner 35 through the through hole 36, and the purification medium that flows into the torch combustor liner 35 from the flame detection passage 80.

The combustion gas at the outlet of the combustion gas pipe 40 serves as an ignition source for igniting the fuel-oxidant mixture in the main combustor liner 120. The higher the temperature of the combustion gas that functions as an ignition source, the more preferable it is. However, although the outer peripheral surface of the combustion gas pipe 40 is cooled by the cooling medium, the inner peripheral surface is exposed to the high-temperature combustion gas. Therefore, in consideration of the thermal stress, oxidation resistance, or the like of the combustion gas pipe 40, the upper limit of the temperature of the combustion gas is set to be equal to or lower than the heat resistant temperature of the material forming the combustion gas pipe 40.

On the other hand, in order to make the combustion gas function as the ignition source, the lower limit of the temperature of the combustion gas is set to a temperature at which the mixture in the main combustor liner 120 can be at least ignited. Therefore, the lower limit of the temperature of the combustion gas is set at 800° C. considering an autoignition temperature in a stoichiometric mixture in the fuel supplied to the main fuel-main oxidant supply part 90, the temperature drop due to dilution of the combustion gas with the cooling medium ejected from the cooling medium passage 45 into the main combustor liner 120, or the like.

In other words, this lower limit value is the temperature at which the mixture in the main combustor liner 120 can be ignited even if the combustion gas ejected from the combustion gas pipe 40 is diluted with the cooling medium ejected from the cooling medium passage 45 in the vicinity of the downstream side at the outlet of the burner 1.

At Step S12, the cooling medium and purification medium supply determination unit 163 refers to the cooling medium and purification medium data 153 to specify the flow rate of the cooling medium to be supplied to the cooling medium passage 45 and the flow rate of the purification medium to be supplied to the flame detection passage 80. Then, the cooling medium and purification medium supply determination unit 163 outputs a signal for controlling the flow rate regulating valve 48 and the flow rate regulating valve 88 to the output unit 141.

The output unit 141 outputs the signal from the cooling medium and purification medium supply determination unit 163 to the flow rate regulating valve 48 and the flow rate regulating valve 88. Thereby, the opening degrees of the flow rate regulating valve 48 and the flow rate regulating valve 88 are adjusted.

Then, the cooling medium of a predetermined flow rate is supplied to the cooling medium passage 45 via the cooling medium supply pipe 47 and the cooling medium introduction passage 46. Further, the purification medium of a predetermined flow rate is supplied to the flame detection passage 80 via the purification medium supply pipe 87 and the purification medium introduction passage 86. As illustrated in FIG. 5, the cooling medium flow rate and the purification medium flow rate are gradually increased to reach the specified flow rates at the time t3.

As illustrated in FIG. 6, the ignition determination unit 164 then determines whether or not the detection signal relating to the flame detection has been input from the flame detection part 75 (Step S13).

When determining that the detection signal was not input in the determination at Step S13 (No at Step S13), the ignition determination unit 164 executes the processing at Step S13 again.

When determining that the detection signal has been input in the determination at Step S13 (Yes at Step S13), the ignition determination unit 164 outputs information on the above determination to the elapsed time determination unit 165.

Then, the elapsed time determination unit 165 determines whether or not the detection signal detected by the ignition determination unit 164 was input after a lapse of the time t3 (Step S14).

When determining that the detection signal was input after a lapse of the time t3 in the determination at Step S14 (Yes at Step S14), the elapsed time determination unit 165 stops the operation of the burner 1 as an abnormal operation, for example.

When determining that the detection signal was input before a lapse of the time t3 in the determination at Step S14 (No at Step S14), the elapsed time determination unit 165 determines whether or not the time has reached the time t3 based on an output signal from the timer (Step S15).

When determining that the time did not reach the time t3 in the determination at Step S15 (No at Step S15), the elapsed time determination unit 165 executes the processing at Step S15 again.

When determining that the time has reached the time t3 in the determination at Step S15 (Yes at Step S15), the elapsed time determination unit 165 outputs information on the above determination to the torch fuel and torch oxidant supply determination unit 161, the main fuel and main oxidant supply determination unit 162, and the cooling medium and purification medium supply determination unit 163.

FIG. 5 illustrates one example where a flame was detected by the flame detection part 75 at the time t2.

The torch fuel and torch oxidant supply determination unit 161 executes processing for stopping the ignition device 50 and processing for regulating the flow rates of the torch fuel and the torch oxidant (Step S16, Step S17).

The main fuel and main oxidant supply determination unit 162 executes processing for supplying the fuel and the oxidant (Step S18).

The cooling medium and purification medium supply determination unit 163 executes processing for regulating the flow rates of the cooling medium and the purification medium (Step S19).

At Step S16, the torch fuel and torch oxidant supply determination unit 161 outputs a signal for stopping the ignition device 50 to the output unit 141.

The output unit 141 outputs the signal from the torch fuel and torch oxidant supply determination unit 161 to the ignition device 50. This causes the ignition device 50 to stop as illustrated in FIG. 5.

At Step S17, the torch fuel and torch oxidant supply determination unit 161 refers to the torch fuel and torch oxidant data 151 and the main flame ignition time data 154 to output a signal for maintaining the flow rates of the fuel and the oxidant at the specified flow rates to the output unit 141. It is possible to refer to information for setting the time t5 in the main flame ignition time data 154.

The output unit 141 outputs the signal from the torch fuel and torch oxidant supply determination unit 161 to the flow rate regulating valve 28 and the flow rate regulating valve 22. Thereby, the opening degrees of the flow rate regulating valve 28 and the flow rate regulating valve 22 are adjusted. Then, as illustrated in FIG. 5, the flow rates of the fuel and the oxidant are maintained at the specified flow rates.

At Step S18, the main fuel and main oxidant supply determination unit 162 refers to the main fuel and main oxidant data 152 and the main flame ignition time data 154 to specify the flow rate of the fuel to be supplied to the main fuel supply pipe 91 (the first main fuel supply pipe 91A and the second main fuel supply pipe 91B) and specify the flow rate of the oxidant to be supplied to the main oxidant supply pipe 92 (the first main oxidant supply pipe 92A and the second main oxidant supply pipe 92B). Then, the main fuel and main oxidant supply determination unit 162 outputs a signal for controlling the flow rate regulating valves 93, 94, 95, and 96 to the output unit 141.

The output unit 141 outputs the signal from the main fuel and main oxidant supply determination unit 162 to the flow rate regulating valves 93, 94, 95, and 96. Thereby, the opening degrees of the flow rate regulating valves 93, 94, 95, and 96 are adjusted.

Then, the fuel of a predetermined flow rate is supplied into the main combustor liner 120 via the first main fuel supply pipe 91A and the first main fuel supply passage 101. Further, the fuel of a predetermined flow rate is supplied into the main combustor liner 120 via the second main fuel supply pipe 91B and the second main fuel supply passage 102.

The oxidant of a predetermined flow rate is supplied into the main combustor liner 120 via the first main oxidant supply pipe 92A and the first main oxidant supply passage 111. Further, the oxidant of a predetermined flow rate is supplied into the main combustor liner 120 via the second main oxidant supply pipe 92B and the second main oxidant supply passage 112. As the oxidant passes through the swirlers 115, 116, a swirling flow of the oxidant is ejected into the main combustor liner 120.

As illustrated in FIG. 5, the flow rate of the fuel and the flow rate of the oxidant supplied from the main fuel-main oxidant supply part 90 are gradually increased to reach the specified flow rates at the time t5.

In the process of increasing the fuel flow rate and the oxidant flow rate, as illustrated in FIG. 5, the fuel-oxidant mixture is ignited in the main combustor liner 120 to form a flame. Here, the fuel-oxidant mixture is ignited by the combustion gas generated in the torch combustor liner 35, which is ejected from the combustion gas pipe 40 into the main combustor liner 120. As described previously, the combustion gas having a temperature of 800° C. or higher is ejected into the main combustor liner 120 from the outlet of the combustion gas pipe 40.

The combustion gas, which is the ignition source, is ejected from the center of the burner 1 in the axial direction. In other words, at the outlet of the burner 1, the fuel ejected from the main fuel supply passage 100 is present around the periphery of the combustion gas, which is the ignition source, and the oxidant ejected from the main oxidant supply passage 110 is present around the fuel.

As above, the combustion gas ejected from the center of the burner 1 in the axial direction is made to function as the ignition source and the fuel and the oxidant are ejected from the surroundings of the combustion gas, thereby enabling reliable ignition of the fuel-oxidant mixture.

Further, the area where the ignition source comes into contact with the fuel-oxidant mixture in the main combustor liner 120 when the combustion gas, which is the ignition source, is introduced from the upstream end of the burner 1, is larger than that when the laser light is used as the ignition source. Therefore, the fuel-oxidant mixture can be ignited reliably.

Further, even if the ignition conditions are changed, by introducing the combustion gas being the ignition source from the upstream end of the burner 1, the fuel-oxidant mixture can be ignited reliably.

Here, there is explained one example where a flame was formed at the time t4 before reaching the time t5. Further, in the following, the flame formed in the main combustor liner 120 is referred to as a main flame.

At Step S19, the cooling medium and purification medium supply determination unit 163 refers to the cooling medium and purification medium data 153 to output a signal for maintaining the flow rate of the cooling medium and the flow rate of the purification medium at the specified flow rates to the output unit 141.

The output unit 141 outputs the signal from the cooling medium and purification medium supply determination unit 163 to the flow rate regulating valve 48 and the flow rate regulating valve 88. Thereby, the opening degrees of the flow rate regulating valve 48 and the flow rate regulating valve 88 are adjusted. Then, as illustrated in FIG. 5, the flow rates of the cooling medium and the purification medium are maintained at the specified flow rates.

Then, the elapsed time determination unit 165 determines whether or not the time has reached the time t5 based on an output signal from the timer (Step S20).

When determining that the time did not reach the time t5 in the determination at Step S20 (No at Step S20), the elapsed time determination unit 165 executes the processing at Step S20 again.

When determining that the time has reached the time t5 in the determination at Step S20 (Yes at Step S20), the elapsed time determination unit 165 outputs information on the above determination to the torch fuel and torch oxidant supply determination unit 161 and the main fuel and main oxidant supply determination unit 162.

Here, the time t5 is set as the time after a lapse of the above-described ignition estimated time T from the time t3. The information on this time t5 is stored in the main flame ignition time data 154, for example.

At the time t3, the fuel of the specified flow rate and the oxidant of the specified flow rate are supplied into the torch combustor liner 35. Then, from the time t3 to the time t5 after a lapse of the ignition estimated time T, a combustion gas for setting the temperature of the combustion gas at the outlet of the combustion gas pipe 40 to 800° C. or higher is generated in the torch combustor liner 35.

The combustion gas generated at the time t3 is ejected from the combustion gas pipe 40 into the main combustor liner 120 during the ignition estimated time T. In other words, before the flow rates of the fuel and the oxidant to be supplied into the main combustor liner 120 reach the specified flow rates (before reaching the time t5), the combustion gas having a temperature of 800° C. or higher, which serves as the ignition source, is ejected from the combustion gas pipe 40 into the main combustor liner 120.

Therefore, as illustrated in FIG. 5, at the time t4 before reaching the time t5, a flame has been formed in the main combustor liner 120. In other words, ignition is completed in the main combustor liner 120 by the time t5 set in consideration of the ignition estimated time T.

Then, the torch fuel and torch oxidant supply determination unit 161 executes processing for stopping the supply of the fuel to the torch fuel supply part 25 and stopping the supply of the oxidant to the torch oxidant supply part 20 (Step S21).

The main fuel and main oxidant supply determination unit 162 executes processing for regulating the flow rate of the fuel and the flow rate of the oxidant (Step S22).

At Step S21, the torch fuel and torch oxidant supply determination unit 161 refers to the torch fuel and torch oxidant data 151 to specify information for stopping the supply of the fuel to the torch fuel introduction passage 26 and stopping the supply of the oxidant to the torch oxidant supply passage 15. Then, the torch fuel and torch oxidant supply determination unit 161 outputs a signal for controlling the flow rate regulating valve 28 and the flow rate regulating valve 22 to the output unit 141. In other words, as illustrated in FIG. 5, the torch fuel and torch oxidant supply determination unit 161 outputs a signal for stopping the supply of the fuel and the supply of the oxidant to the torch combustor liner 35 at the time t5.

The output unit 141 outputs the signal from the torch fuel and torch oxidant supply determination unit 161 to the flow rate regulating valve 28 and the flow rate regulating valve 22. Thereby, the opening degrees of the flow rate regulating valve 28 and the flow rate regulating valve 22 are adjusted to be closed.

Then, as illustrated in FIG. 5, the supply of the fuel to the torch fuel introduction passage 26 and the supply of the oxidant to the torch oxidant supply passage 15 are stopped.

Here, there is explained one example where the supply of the fuel and the supply of the oxidant are stopped after a predetermined time from the time t5, but the present invention is not limited to this control. The supply of the fuel and the supply of the oxidant may be stopped at the time t5.

At Step S22, the main fuel and main oxidant supply determination unit 162 refers to the main fuel and main oxidant data 152 to output a signal for maintaining the flow rates of the fuel and the oxidant at the specified flow rates to the output unit 141.

The output unit 141 outputs the signal from the main fuel and main oxidant supply determination unit 162 to the flow rate regulating valves 93, 94, 95, and 96. Thereby, the opening degrees of the flow rate regulating valves 93, 94, 95, and 96 are adjusted. Then, as illustrated in FIG. 5, the flow rates of the fuel and the oxidant are maintained at the specified flow rates.

Subsequently, the torch fuel and torch oxidant supply determination unit 161 determines whether or not the supply of the fuel and the supply of the oxidant have been stopped based on information relating to the valve opening degrees of the flow rate regulating valve 28 and the flow rate regulating valve 22, output signals from a flowmeter (not illustrated) provided with the torch fuel supply pipe 27 and a flowmeter (not illustrated) provided with the torch oxidant supply pipe 21, or the like, for example (Step S23).

When determining that the supply of the fuel and the supply of the oxidant were not stopped in the determination at Step S23 (No at Step S23), the torch fuel and torch oxidant supply determination unit 161 executes the processing at Step S23 again.

When determining that the supply of the fuel and the supply of the oxidant have been stopped in the determination at Step S23 (Yes at Step S23), the torch fuel and torch oxidant supply determination unit 161 output information on the above determination to the ignition determination unit 164.

The ignition determination unit 164 determines whether or not the detection signal relating to flame detection has been input from the flame detection part 75 (Step S24).

Here, the torch flame has been extinguished at the time of determination at Step S24, and thus, the flame detected by the flame detection part 75 is the main flame. The flame detection part 75 continuously detects the torch flame or the main flame, and thus, as illustrated in FIG. 5, the signal from the flame detection part 75 becomes an On signal at and after the time t2.

When determining that the detection signal was not input in the determination at Step S24 (No at Step S24), the ignition determination unit 164 stops the operation of the burner 1 as an abnormal operation, for example.

When determining that the detection signal has been input in the determination at Step S24 (Yes at Step S24), the ignition determination unit 164 outputs information on the above determination to the elapsed time determination unit 165.

The elapsed time determination unit 165 determines whether or not a predetermined time has elapsed since the time t5 or the time when the supply of the fuel to the torch fuel supply pipe 27 and the supply of the oxidant to the torch oxidant supply pipe 21 stopped based on an output signal from the timer (Step S25).

Here, as the predetermined time, for example, the time from the formation of the main flame to the start of a turbine load operation, or the like is cited as an example.

When determining that the predetermined time did not elapse in the determination at Step S25 (No at Step S25), the elapsed time determination unit 165 executes the processing at Step S25 again.

When determining that the predetermined time has elapsed in the determination at Step S25 (Yes at Step S25), the elapsed time determination unit 165 outputs information on the above determination to the main fuel and main oxidant supply determination unit 162.

The main fuel and main oxidant supply determination unit 162 executes processing for regulating the flow rates of the fuel and the oxidant (Step S26).

At Step S26, the main fuel and main oxidant supply determination unit 162 refers to the main fuel and main oxidant data 152 to specify the flow rates of the fuel and the oxidant according to a turbine load, for example. Then, the main fuel and main oxidant supply determination unit 162 outputs a signal for controlling the flow rate regulating valves 93, 94, 95, and 96 to the output unit 141.

The output unit 141 outputs the signal from the main fuel and main oxidant supply determination unit 162 to the flow rate regulating valves 93, 94, 95, and 96 (the time t6). Thereby, the opening degrees of the flow rate regulating valves 93, 94, 95, and 96 are adjusted.

As described above, the burner 1 in the embodiment can eject the combustion gas, which is the ignition source, from the center of the burner 1 into the main combustor liner 120, which is a main combustion chamber, in the axial direction.

Further, the burner 1 can eject the fuel to the outer periphery of the combustion gas, which is the ignition source, and eject the oxidant to the periphery of the fuel. Thereby, it is possible to reliably ignite the fuel-oxidant mixture in the main combustor liner 120 regardless of the ignition conditions such as the ejection pattern of the fuel or oxidant into the main combustor liner 120 and the position where the optimum fuel-oxidant mixture for ignition is formed, for example.

Further, as compared to a conventional combustor including an ignition device that emits laser light to the combustor liner from a direction vertical to the center axis direction of the combustor liner, the combustor including the burner 1 in the embodiment is hardly affected by changes in the axial direction with respect to ignition, even when the ignition conditions are changed. Therefore, the combustor including the burner 1 in the embodiment enables reliable ignition even when the optimum ignition position is shifted in the axial direction due to changes in the ignition conditions.

Here, in a combustor of a conventional gas turbine, the flame detection part is arranged in a direction vertical to the center axis direction of the combustor liner, similarly to the ignition device. Then, the flame detection part detects the flame from the direction vertical to the center axis direction of the combustor liner. Therefore, the flame detection part that detects the flame from the direction vertical to the center axis direction of the combustor liner may not be able to detect flames.

On the other hand, in the burner 1 in the embodiment, the combustion gas pipe 40, the torch combustor liner 35, the through portion 14b, the through hole 17a, and the flame detection part 75 are communicated with one another coaxially with the center axis O as the center axis. Thereby, the flame formed in the main combustor liner 120 can be detected from the upstream side in the axial direction. Therefore, in the burner 1 in the embodiment, the flame can be detected accurately even when the flame fluctuates in the axial direction, for example.

Further, for example, even when a thick combustor casing is provided as in the combustor in the supercritical $CO_2$ gas turbine facility, providing the burner 1 eliminates the need to provide the ignition device and the flame detection part in the combustor casing. Therefore, it is possible to avoid a complicated design for providing the ignition device and the flame detection part in the combustor casing.

Here, the burner 1 in the above-described embodiment can be applied, for example, to commonly used industrial and aviation gas turbine combustors, combustors in supercritical $CO_2$ gas turbine facilities, gas turbine combustors that burn hydrogen with air or oxygen, and so on.

According to the above-explained embodiment, it is possible to reliably ignite the mixture of the supplied fuel and oxidant, regardless of the ignition conditions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A burner with a torch ignition mechanism, comprising:
   a tubular torch part extending in an axial direction;
   a main fuel-main oxidant supply part provided on one end side of the torch part and formed in an annular shape on an outer periphery of the torch part; and
   a flame detection mechanism provided on the other end side of the torch part, wherein
   the torch part includes:
      a torch part casing;
      a torch combustor liner that is provided in the torch part casing and burns a fuel and an oxidant;
      a torch fuel supply part that supplies a fuel into the torch combustor liner;
      a torch oxidant supply part that supplies an oxidant into the torch combustor liner;
      an ignition device that ignites a fuel-air mixture inside the torch combustor liner;
      a combustion gas pipe that extends from the torch combustor liner toward one end side of the torch part, is arranged at the center of the torch part, and leads a combustion gas generated in the torch combustor liner to one end side of the torch part; and
      a cooling medium passage that is formed in an annular shape between the torch combustor liner and the combustion gas pipe and the torch part casing, and leads a cooling medium toward one end side of the torch part,
   the main fuel-main oxidant supply part includes:
      a main fuel supply passage formed in an annular shape on the outer periphery of the torch part; and
      a main oxidant supply passage formed in an annular shape on an outer periphery of the main fuel supply passage, and
   the flame detection mechanism includes:
      a flame detection part provided on the other end side of the torch part,
      (A) the flame detection part detecting a flame in the torch combustor liner when a flame is formed in the torch combustor liner and (B) the flame detection part detecting a flame formed by a fuel and an oxidant supplied from the main fuel-main oxidant supply part when no flame is formed in the torch combustor liner; and
      a flame detection passage that communicates the flame detection part with the torch combustor liner,
   wherein the combustion gas pipe, the torch combustor liner, the flame detection passage, and the flame detection part are arranged coaxially with a center axis of the burner.

2. The burner with the torch ignition mechanism according to claim 1, wherein
   the flame detection mechanism further includes:

a light transmission member that is provided between the flame detection part and the flame detection passage and transmits light from a flame to the flame detection part side; and a purification medium supply portion that supplies a purification medium that purifies the light transmission member to the flame detection passage.

3. The burner with the torch ignition mechanism according to claim 1, wherein the main fuel supply passage includes:

a first main fuel supply passage formed in an annular shape on the outer periphery of the torch part; and a second main fuel supply passage formed in an annular shape on an outer periphery of the first main fuel supply passage.

4. The burner with the torch ignition mechanism according to claim 3, wherein the main oxidant supply passage includes:

a first main oxidant supply passage formed in an annular shape on the outer periphery of the main fuel supply passage; and a second main oxidant supply passage formed in an annular shape on an outer periphery of the first main oxidant supply passage.

\* \* \* \* \*